June 21, 1960 R. J. SARGENT 2,941,548
SELECTOR CONTROL
Filed Jan. 14, 1957 2 Sheets-Sheet 2

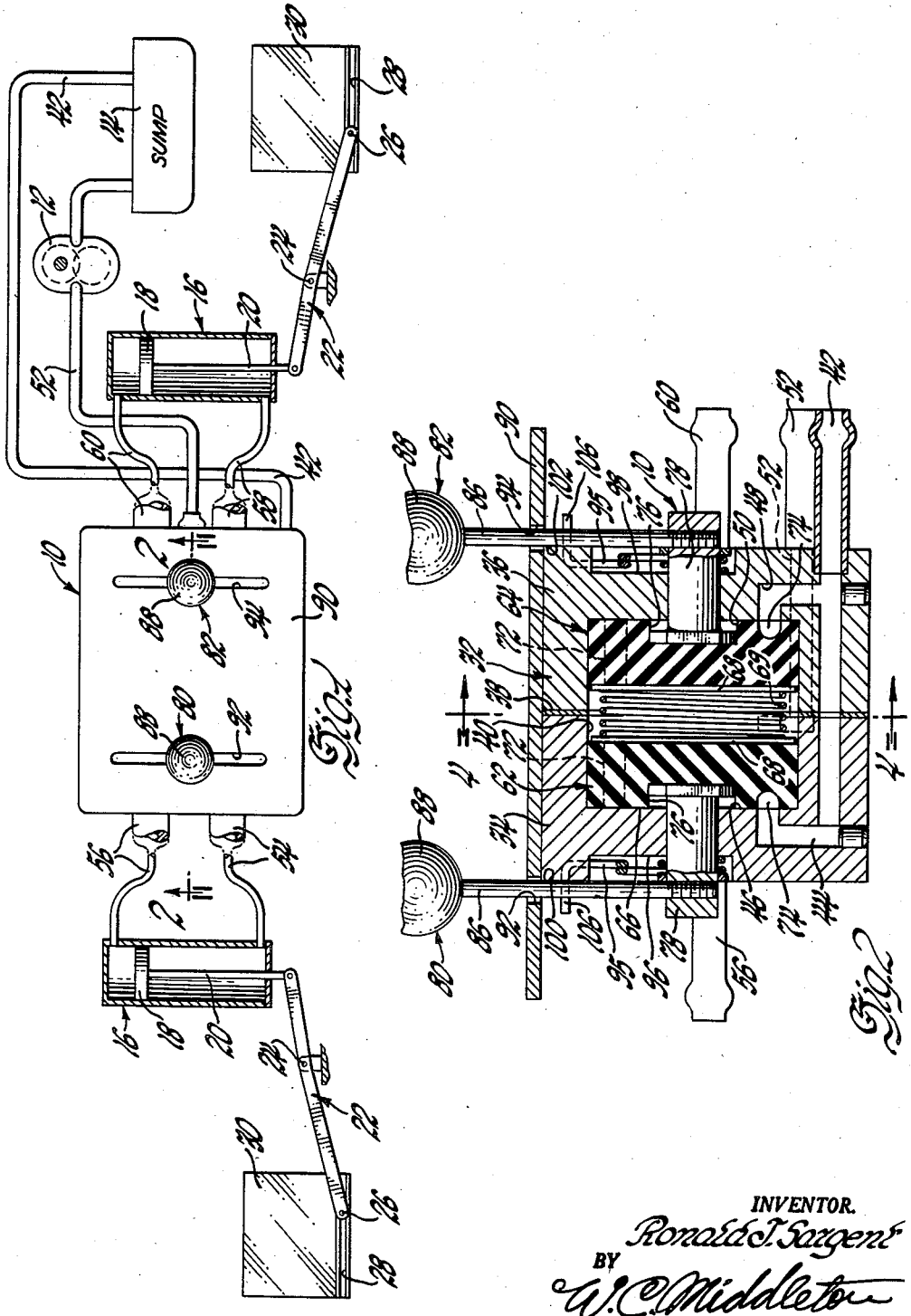

INVENTOR.
Ronald J. Sargent
BY
W. C. Middleton
ATTORNEY

United States Patent Office 2,941,548
Patented June 21, 1960

2,941,548
SELECTOR CONTROL

Ronald J. Sargent, Clio, Mich., assignor to General Motors Corporation, Detroit, Mich., a corporation of Delaware Filed Jan. 14, 1957, Ser. No. 634,013

4 Claims. (Cl. 137—624)

This invention relates to selector controls and particularly to improvements in control valving for pressure systems.

Generally, in pressure systems employing servomotors, e.g., window systems, it is desirable that the number of controls be reduced and that such controls should operate efficiently without leaking or without unwanted intermingling of pressures. To reduce the number of controls, it is necessary that each control accomplish several functions. As a result of this combining function, problems occur, for instance, leakages and timing of events to insure against undesired overlap that might for an interval relieve a pressure or cause mingling of different pressures.

With these considerations in mind, the present invention contemplates a selector control that effectively combines several functions with a minimum of valves, that transfers pressures without relieving or exhausting one of the pressures for an instant, and that has special provisions against leakages in the valve control area.

In carrying out the invention, a pair of valve rotors are provided in spaced confronting relation within a chamber in a valve casing. Pressure from a source is admitted by an inlet passage to the space between the rotors urging the rotor control faces into an abutting sealing relation with the adjacent chamber faces. These coacting faces transfer pressure from between the rotors to an outlet passage connected to a device to be operated, such as a servomotor, or interconnect the outlet passage and an exhaust passage relieving the servomotor of pressure. During relief of the servomotor communication between the inlet and outlet passages is interrupted. Each valve rotor is individually rotatable, against a bias that urges the associated rotor to a centered or neutral position, to opposite positions and each rotor controls a separate servomotor.

The foregoing and other objects and advantages will be more apparent from the following description and accompanying drawings in which:

Figure 1 is a view of a selector control according to the invention combined with a window system illustrated schematically.

Figure 2 is a sectional view of the selector control along lines 2—2 of Figure 1.

Figure 3:
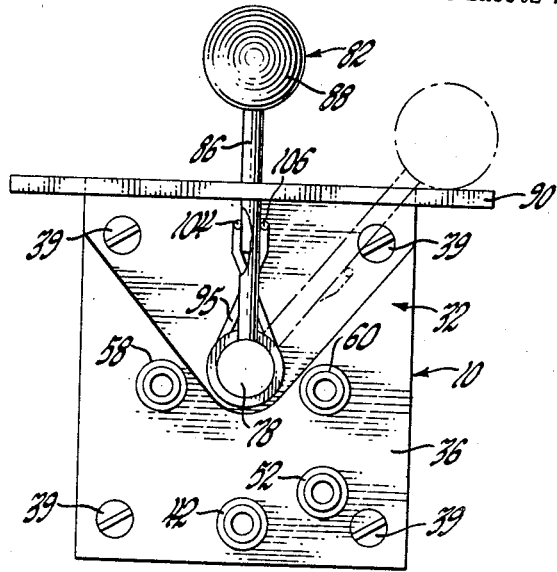
Figure 3 is an end view of the control.

In Figure 1 a selector control 10 according to the invention is demonstrated in a window system. Pressure fluid for the system is derived from a suitable source such as pump 12 which communicates with a reservoir or sump 14. This pressure fluid is directed from the pump 12 by the selector control 10 to individual servomotors 16 that raise and lower windows. Each of the servomotors 16 is of conventional construction and includes slidable therein a piston 18 with an attached piston rod 20. The rod 20 is linked to a connecting lever 22 pivotally mounted at 24. The end of the lever 22 opposite the end linked to the piston rod 20 has annexed thereto a pin 26 which is slidably received in a guide slot 28 along an edge of a window 30. By manipulating the selector control 10, pressure fluid can be directed to one end or the other of the servomotor 16, hence, actuating lever 22 to raise or lower the window 30.

Referring to Figure 2, the selector control 10 includes a valve casing 32 which is constructed in two sections 34 and 36. These sections have aligned confronting bores which when the sections, with a gasket 38 therebetween, are secured together by bolts 39, form a chamber 40. The casing has an exhaust passage 42 that is suitably connected to the sump 14 and which passage is connected to a transverse passage 44 opening into a chamber face 46 in the section 34 and a transverse passage 48 opening into a chamber face 50 in the section 36. An inlet passage 52 communicates with the pump 12 and opens into the chamber 40 approximately at the intersection of the two sections 34 and 36. On the left side of the casing 32, a pair of radially spaced outlet passages 54 and 56 intercommunicate with opposite ends of the servomotor 16 and chamber face 46 and on the opposite side of a pair of outlet passages 58 and 60 intercommunicate with opposite sides of another servomotor and chamber face 50.

Figure 4:
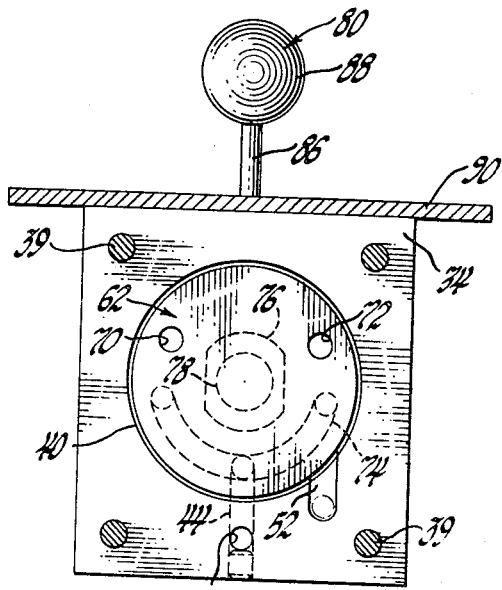
Figure 4 is a sectional view of the control along lines 4—4 of Figure 2.

Within the chamber 40 in spaced relation are a pair of valve rotors 62 and 64. The peripheries of these rotors 62 and 64 coact with the surface of the chamber 40 so that relative movement without leakage between the engaging surfaces is allowed. Each of the rotors is identical and include control faces 66 and opposite pressure faces 68, the latter faces being in confronting spaced relation. A spring 69 is interposed between the rotors and urges the control face 66 of the rotor 62 into sealing engagement with the chamber face 46 and the control face 66 of the rotor 64 into sealing engagement with the chamber face 50. As shown in Figure 4, the valve rotors 62 and 64 each has a pair of radially spaced transfer passages 70 and 72 opening into the opposite faces 66 and 68. Below these transfer passages 70 and 72, an arcuate channel 74 is provided along the control face 66 of each rotor which channels communicate with the transverse passages 44 and 48. The transfer passages 70 and 72, outlet passages, 54, 56 and 58, 60 and the channels 74, all are the same radial distance from the rotational axis of the rotors 62 and 64.

To rotate the rotors 62 and 64, drive slots 76 are furnished in faces 66 for reception of the ends of identical valve stems 78 extending from opposite sides of the housing 32. Identical handles 80 and 82 have rods 86 that at the lower ends are threadedly engaged with the valve stems 78 and at the upper ends are connected to balls 88. A mounting plate 90 is attached to the top of the housing 32 and is provided with an elongated guide slot 92 through which the rod 86 of the handle 80 extends and elongated guide slot 94 through which the rod 86 of handle 82 extends. These guide slots 92 and 94 limit and guide movements of the handles 80 and 82.

For returning the handles 80 and 82 to a centered position, shown in full lines in Figure 3, springs 95 are utilized. To accommodate the springs 95, the outer sides of the sections 34 and 36 are provided with recessed portions 96 and 98, respectively. At the upper midpoint of these recesses, tabs such as tab 100 on section 34 and tab 102 on section 36 are employed for abutting the ends 104 and 106 of the spring 95. The springs 95 wrap around each of the valve stems 78 and are placed within the recesses 96 and 98. The ends 104 and 106 extend beyond the tabs 100 and 102 respectively and embrace the rods 86 of the handles. Therefore, if the handle 82 is moved downwardly, e.g., to the dotted line position in Figure 3, the end 106 will be carried by rod 86 tensioning the spring 95 while end 104 remains against the tab 102. Then, since the tab 102 furnishes a reaction point, when the handle 82 is released, the end 106 of the spring will return the handle to the full line position.

Since the valve rotors 62 and 64 function in the same manner, the operation of only rotor 64 will be explained. As has been mentioned, whenever one of the handles such as handle 82 is released, the spring 95 will return it to the centered full line position of Figure 3. In this centered or neutral position, which will be first described, pressure fluid from the pump 12 is transferred through the inlet passage 52 to the space in the chamber 40 between the two rotors 62 and 64. This pressure fluid aids the spring 69 in maintaining the valve rotor control faces 66 in engagement with the chamber faces 46 and 50 creating a more effective seal therebetween. The transfer passages 70 and 72, although exposed to pressure fluid from the inlet passage 52 along the pressure face, are cut off by the chamber face 50 from communication with the outlet passages 58 and 60. As best illustrated by Figure 4, the exhaust passage 42 through the branch 48 and the radial channel 74 along the control face 66 of the rotor 64 is in communication with each of the outlet passages 58 and 60. In this position of the rotor 64, both of these outlet passages are aligned with the opposite ends of the radial channel 74 so that pressure fluid is relieved from both ends of the servomotor 16 to the sump 14.

When the handle 82 is rotated downwardly in opposition to the bias of spring 95 to the Figure 3 dotted line position, the radial channel 74 is rotated out of alignment with one of the outlet passages, in this instance passage 60, while the other outlet passage 58 still remains in communication with channel 74, consequently, relieving the bottom end of the servomotor 16 through branch 48 to the sump 14. The transverse passage 72 will be rotated into alignment with the outlet passage 60 and transfer pressure fluid from the pump 12 and inlet passage 52 to the upper end of the servomotor 16, moving the piston 18 downwardly. Rotation of the handle 84 in the opposite extreme position will relieve exhaust passage 60 and align transverse passage 70 with the outlet passage 58 so that pressure fluid will move the servomotor piston 18 upwardly to the position shown. In each extreme position, upon removal of restraint from the handle 82, the spring 95 will move it back to the neutral or centered position.

As now can be seen, the selector control 10 provides selectively operable controls for two individual servomotors. Furthermore, pressure fluid from the source aids in sealing the rotor control faces 66 against leakage, a desirable feature, since leakage is most likely to occur in the vicinity of these faces.

The selector control has been described in conjunction with a window system and as employing pressure fluid. It is obvious that the control may be used in other type systems. Furthermore, fluid or gas at either super-atmospheric or sub-atmospheric pressures may be utilized with only minor changes, apparent to those skilled in the art.

I claim:

1. A selector control comprising; in combination; a valve casing including opposite side walls defining a chamber; a pair of spaced valve rotors rotatable in the chamber; each valve rotor including a control face with a channel therein and in engagement with one of said side walls, an opposite pressure face, and a pair of spaced transfer passages extending between the faces of the rotor; the casing having opening into the chamber between the confronting pressure faces of each valve rotor a pressure inlet passage and opening into the chamber adjacent the control face of each valve rotor a pair of spaced outlet passages and an exhaust passage spaced between said pair of outlet passages so as to be communicatively aligned with the channel in each valve rotor; and biasing means combining with inlet passage pressure acting on the confronting pressure faces of each valve rotor so that both urge the control face of each into sealing engagement with the respective side wall; each valve rotor being revolvable in opposite directions from a neutral position in which the channel in the control face establishes communication between the exhaust passage and both of the outlet passages of said pair to operative positions in both of which one of the transfer passages in the valve rotor establishes communication between the inlet passage and one of the outlet passages of said pair and the channel in the control face of the rotor interrupts communication between the exhaust passage and said one of the outlet passages of said pair while maintaining communication between the exhaust passage and the other of the outlet passages of said pair.

2. A selector control comprising; in combination; a valve casing including opposite side walls defining a chamber; a pair of spaced valve rotors rotatable in the chamber; each valve rotor including a control face with a channel therein and in engagement with one of said side walls, an opposite pressure face, and a pair of spaced transfer passages extending between the faces of the rotor; the casing having opening into the chamber between the confronting pressure faces of each valve rotor a pressure inlet passage and opening into the chamber adjacent the control face of each valve rotor a pair of spaced outlet passages and an exhaust passage spaced between said pair of outlet passages so as to be communicatively aligned with the channel in each valve rotor; biasing means combining with inlet passage pressure acting on the confronting pressure faces of each valve rotor so that both urge the control face of each into sealing engagement with the respective side wall; each valve rotor being revolvable in opposite directions from a neutral position in which the channel in the control face establishes communication between the exhaust passage and both of the outlet passages of said pair to operative positions in both of which one of the transfer passages in the valve rotor establishes communication between the inlet passage and one of the outlet passages of said pair and the channel in the control face of the rotor interrupts communication between the exhaust passage and said one of the outlet passages of said pair while maintaining communication between the exhaust passage and the other of the outlet passages of said pair; and restoring means for returning each valve rotor to the neutral position.

3. A selector control comprising; in combination; a valve casing including opposite side walls defining a chamber; a pair of spaced valve rotors rotatable in the chamber; each valve rotor including a control face with a channel therein and in engagement with one of said side walls, an opposite pressure face, and a pair of spaced transfer passages extending between the faces of the rotor; the casing having opening into the chamber between the confronting pressure faces of each valve rotor a pressure inlet passage, and opening into the chamber adjacent the control face of each valve rotor a pair of spaced outlet passages and an exhaust passage spaced between said pair of outlet passages so as to be communicatively aligned with the channel in each valve rotor; biasing means combining with inlet passage pressure acting on the confronting pressure faces of each valve rotor so that both urge the control face of each into sealing engagement with the respective side wall; a manually operable handle connected to each valve rotor; each valve rotor being revolvable in opposite directions from a neutral position in which the channel in the control face establishes communication between the exhaust passage and both of the outlet passages of said pair to operative positions in both of which one of the transfer passages in the valve rotor establishes communication between the inlet passage and one of the outlet passages of said pair and the channel in the control face of the rotor interrupts communication between the exhaust passage and said one of the outlet passages of said pair while maintaining communication between the exhaust passage and the other of the outlet passages of said pair; a guide member attached to the valve casing and having guide openings therein for reception of each of the handles so as to restrict the movement thereof to a rotary plane and to a predetermined angular displacement; and restoring means for returning each valve rotor to the neutral position.

4. A selector control comprising; in combination; a valve casing including opposite side walls defining a chamber; a pair of spaced valve rotors rotatable in the chamber; each valve rotor including a control face with an arcuate channel therein and in engagement with one of said side walls, an opposite pressure face, and a pair of spaced transfer passages extending between the faces of the rotor; the casing having opening into said chamber between the confronting pressure faces of each valve rotor a pressure inlet passage and opening from each side wall into the chamber adjacent the control face of each valve rotor a pair of spaced outlet passages and an exhaust passage spaced intermediate said pair of outlet passages so as to be communicatively aligned with the arcuate channel in each valve rotor; biasing means combining with inlet passage pressure acting on the confronting pressure faces of each valve rotor so that both urge the control faces of each into sealing engagement with the respective side wall; a manually operable handle connected to each valve rotor; each valve rotor being revolvable in opposite directions from a neutral position in which the channel in the control face establishes communication between the exhaust passage and each of the outlet passages of said pair to operative positions in both of which one of the transfer passages in the valve rotor establishes communication between the inlet passage and one of the outlet passages of said pair and the channel in the control face of the rotor interrupts communication between the exhaust passage and said one of the outlet passages of said pair while maintaining communication between the exhaust passages and the other of the outlet passages of said pair; a guide member attached to the valve casing and having guide openings therein for reception of each of the handles so as to limit both lateral and angular movement of each handle to a predetermined extent; and a spring coacting with each handle for returning the handle to the neutral position.

References Cited in the file of this patent

UNITED STATES PATENTS

| | | |
|---|---|---|
| 1,147,820 | Scott | July 27, 1915 |
| 1,489,396 | Odum | Apr. 8, 1924 |
| 2,042,186 | Peterson | May 26, 1936 |
| 2,198,543 | Lauterbach | Apr. 23, 1940 |
| 2,366,127 | Rappl | Dec. 26, 1944 |

FOREIGN PATENTS

| | | |
|---|---|---|
| 113,696 | Germany | Oct. 4, 1900 |